(12) United States Patent
Tyler et al.

(10) Patent No.: US 10,692,402 B2
(45) Date of Patent: Jun. 23, 2020

(54) SIMULATED FIBROUS TISSUE FOR SURGICAL TRAINING

(71) Applicants: Brandon William Russell Tyler, Toronto (CA); Gregory Allan Whitton, Toronto (CA); Fergal Kerins, Toronto (CA)

(72) Inventors: Brandon William Russell Tyler, Toronto (CA); Gregory Allan Whitton, Toronto (CA); Fergal Kerins, Toronto (CA)

(73) Assignee: Synaptive Medical (Barbados) Inc., Bridgetown (BB)

(*) Notice: Subject to any disclaimer, the term of this patent is extended or adjusted under 35 U.S.C. 154(b) by 159 days.

(21) Appl. No.: 15/587,438

(22) Filed: May 5, 2017

(65) Prior Publication Data

US 2018/0322810 A1   Nov. 8, 2018

(51) Int. Cl.
| | | |
|---|---|---|
| *G09B 23/28* | (2006.01) | |
| *G09B 23/32* | (2006.01) | |
| *G09B 23/34* | (2006.01) | |
| *B29C 39/02* | (2006.01) | |
| *B29C 39/00* | (2006.01) | |
| *B29C 41/12* | (2006.01) | |
| *B29K 31/00* | (2006.01) | |
| *B29K 105/08* | (2006.01) | |
| *B29L 31/00* | (2006.01) | |
| *B29K 309/08* | (2006.01) | |

(52) U.S. Cl.
CPC ............ *G09B 23/32* (2013.01); *B29C 39/003* (2013.01); *B29C 39/025* (2013.01); *B29C 41/12* (2013.01); *G09B 23/34* (2013.01); *B29K 2031/04* (2013.01); *B29K 2105/08* (2013.01); *B29K 2309/08* (2013.01); *B29K 2995/0037* (2013.01); *B29L 2031/7546* (2013.01); *G09B 23/286* (2013.01)

(58) Field of Classification Search
USPC .................................. 434/262, 267, 268, 272
See application file for complete search history.

(56) References Cited

U.S. PATENT DOCUMENTS

| | | | |
|---|---|---|---|
| 4,101,494 A | 7/1978 | Kent et al. | |
| 7,288,759 B2 | 10/2007 | Frangioni et al. | |
| 7,993,140 B2* | 8/2011 | Sakezles | G09B 23/306 434/267 |
| 8,323,029 B2* | 12/2012 | Toly | G09B 23/28 434/267 |

(Continued)

OTHER PUBLICATIONS

Chaouat, M. et al., "A Novel Cross-linked Poly (vinyl alcohol) (PVA) for Vascular Grafts", Advanced Functional Materials 2008, 18, pp. 2855-2861.

(Continued)

*Primary Examiner* — Kurt Fernstrom
(74) *Attorney, Agent, or Firm* — Rowand LLP

(57) ABSTRACT

Disclosed herein are simulated fibrous tissue models of anatomical parts for surgical training. The non-dissolvable simulated fibrous tissue model is made of a polyvinyl alcohol (PVA) and fibrous material composite to simulate realistic tissue properties and behaviors. The simulated fibrous tissue model may be a standalone model of an anatomical part or may be used in a complementary anatomical simulation kit to provide a more comprehensive training approach.

17 Claims, 7 Drawing Sheets

(56) References Cited

U.S. PATENT DOCUMENTS

| | | | |
|---|---|---|---|
| 8,795,708 B2 | 8/2014 | Xu et al. | |
| 8,870,576 B2* | 10/2014 | Millon | B29C 39/003 |
| | | | 434/267 |
| 8,911,238 B2* | 12/2014 | Forsythe | G09B 23/28 |
| | | | 434/267 |
| 9,186,436 B2 | 11/2015 | Wan et al. | |
| 9,271,822 B2 | 3/2016 | Xu et al. | |
| 2008/0076101 A1* | 3/2008 | Hyde | G09B 23/30 |
| | | | 434/272 |
| 2010/0209899 A1* | 8/2010 | Park | G09B 23/34 |
| | | | 434/272 |
| 2012/0034587 A1* | 2/2012 | Toly | G09B 23/285 |
| | | | 434/267 |
| 2012/0045743 A1* | 2/2012 | Okano | G09B 23/30 |
| | | | 434/272 |
| 2012/0156666 A1* | 6/2012 | Okano | G09B 23/285 |
| | | | 434/272 |
| 2012/0288839 A1* | 11/2012 | Crabtree | B65D 75/008 |
| | | | 434/267 |
| 2014/0106329 A1* | 4/2014 | Watanabe | G09B 23/30 |
| | | | 434/272 |
| 2015/0037776 A1 | 2/2015 | Redaelli et al. | |
| 2016/0027341 A1* | 1/2016 | Kerins | G09B 23/34 |
| | | | 434/270 |
| 2016/0155364 A1* | 6/2016 | Piron | G01R 33/58 |
| | | | 434/270 |

OTHER PUBLICATIONS

Tai, B.L. et al., "Development of a 3D-printed external ventricular drain placement simulator: technical note", Journal of Neurosurgery, Oct. 2015, 123, pp. 1070-1076.

Mohammadi, H. et al., "Simulation of Anastomosis in Coronary Artery Bypass Surgery", Cardiovascular Engineering and Technology, Dec. 2016, vol. 7, No. 4, pp. 432-438.

* cited by examiner

SIMULATED FIBROUS TISSUE FOR SURGICAL TRAINING

FIELD

The present disclosure relates generally to the field of tissue simulators for surgical training. More particularly, the subject matter of the present disclosure relates to the field of simulated fibrous tissue models of anatomical parts providing a visual and biomechanical mimic of anatomical parts for surgical training, such as training with different types of imaging modalities and training for invasive surgical procedures.

BACKGROUND

Simulated tissue models serve many purposes including but not limited to training of surgeons or other clinicians for practicing medical procedures, imaging, and other procedures requiring mimics having tissue like properties. For these applications the most useful simulated tissue models are constructed to provide realistic visual and biomechanical properties of actual tissue regions being operated on or passed through during a medical procedure. Such tissue models must therefore approximate actual tissue being encountered in a procedure as close as possible, for example, for surgical procedures, various sub-anatomical structures within the organ being operated on can differ in their shape, material and behavioral properties. Thus, simulated tissue models generally contain tissue mimic materials for each type of tissue likely to be encountered during a medical procedure.

Since image-guided surgical procedures are complex in nature and the risk associated with use of such procedures in the brain is very high, the surgical staff must often resort to performing a simulated rehearsal of the entire procedure. Currently, simulated tissue models for surgical training do not fully match the material and behavioral characteristics of physiological tissue. The tools and models that are currently available for such simulated rehearsal and training exercises may not provide a sufficiently accurate simulation of the procedure. For example, in neurosurgery, the meningeal layer must first be traversed in order to gain access to the brain. Current models for neurosurgical training are insufficiently realistic to mimic the material and behavioral characteristics of the craniotomy workflow, in particular cutting through the meningeal layer. Thus, a need exists for a realistic simulated fibrous tissue model of anatomical parts to provide a realistic representation of anatomical structures for surgical training.

SUMMARY

In some embodiments, the present disclosure describes a method of creating a simulated fibrous tissue model of an anatomical part for surgical training. In some examples, the method may consist of obtaining a mold of an anatomical part, applying a first volume of polyvinyl alcohol (PVA) solution onto the mold, applying a fibrous material onto the first volume of PVA solution previously applied onto the mold, applying a second volume of PVA solution onto the fibrous material in an amount sufficient to soak the fibrous material and allowing the PVA and fibrous material composite to dry and conform, setting to the shape of the anatomical mold. In the same example, once the PVA and fibrous material composite form is set, it may be released from the anatomical mold.

In some examples, the present disclosure describes processes for producing a simulated fibrous tissue model of an anatomical part for surgical training. In some examples, the method may consist of obtaining a mold of an anatomical part, applying a first volume of PVA solution onto the mold, applying a fibrous material onto the first volume of PVA solution previously applied onto the mold, applying a second volume of PVA solution onto the fibrous material in an amount sufficient to soak the fibrous material and allowing the PVA and fibrous material composite to dry and conform, setting to the shape of the anatomical mold. In the same example, once the PVA and fibrous material composite form is set, it may be released from the anatomical mold. In some examples, the present disclosure describes a simulated fibrous tissue model of an anatomical part for surgical training. The simulated fibrous tissue model comprising a PVA and fibrous composite material is molded to mimic an anatomical part and designed to mimic tissue properties and behaviors of said anatomical part for surgical training.

In some examples, the simulated fibrous tissue model may be a standalone model of an anatomical part or may be used in a complementary anatomical simulation kit to provide a more comprehensive training approach.

A further understanding of the functional and advantageous aspects of the present disclosure can be realized by reference to the following detailed description and drawings.

BRIEF DESCRIPTION OF THE DRAWINGS

Embodiments will now be described, by way of example only, with reference to the drawings, in which.

DETAILED DESCRIPTION

The method and device described herein may be useful for various medical training procedures, including, but not limited to, neurosurgical, orthopaedic and cardiovascular procedures. The method and device described herein may be useful for creating a variety of simulated fibrous tissues of various anatomical parts. It should be noted that while the present disclosure describes examples in the context of the head and brain for neurosurgery, the present disclosure may be applicable to other procedures that benefit from simulated fibrous tissues of anatomical parts for surgical training purposes.

Various embodiments and aspects of the disclosure will be described with reference to details discussed below. The following description and drawings are illustrative of the disclosure and are not to be construed as limiting the disclosure. Numerous specific details are described to provide a thorough understanding of various embodiments of the present disclosure. However, in certain instances, well-known or conventional details are not described in order to provide a concise discussion of embodiments of the present disclosure.

As used herein, the terms "comprises" and "comprising" are to be construed as being inclusive and open-ended, and not exclusive. Specifically, when used in the specification and claims, the terms "comprises" and "comprising" and variations thereof mean the specified features, steps or components are included. These terms are not to be interpreted to exclude the presence of other features, steps or components.

As used herein, the term "exemplary" means "serving as an example, instance, or illustration," and should not be construed as preferred or advantageous over other configurations disclosed herein.

As used herein, the terms "about" and "approximately" and "substantially" are meant to cover variations that may exist in the upper and lower limits of the ranges of values, such as variations in properties, parameters, and dimensions.

Unless defined otherwise, all technical and scientific terms used herein are intended to have the same meaning as commonly understood by one of ordinary skill in the art.

Figure 1:
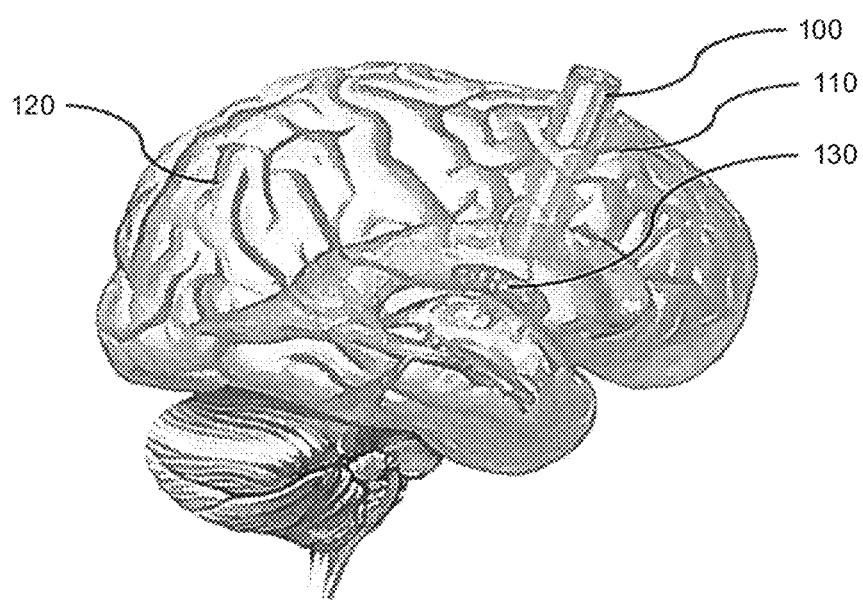
FIG. 1 is an illustration of an example port-based surgical approach. A port is inserted along the sulci to approach a tumor located deep in the brain.

When performing surgical and/or diagnostic procedures that involve the brain, neurosurgical techniques such as a craniotomy, or a minimally invasive procedure such as an endo-nasal surgery or a port-based surgical method, may be performed to provide access to the brain. In such cases, as indicated, the medical procedure is invasive of the mammalian head. For example, in the port-based surgical method illustrated in FIG. 1, a port (100) is inserted along the sulci (110) of the brain (120) to access a tumor (130) located deep in the brain. The cylindrical port (100) provides the surgeon with access to the interior portion of the patient's brain being operated on.

According to embodiments provided herein, the simulation of such procedures may be achieved by providing a brain model that is suitable for simulating the surgical procedure through one or more layers of the head. Such a procedure may involve perforating, drilling, boring, punching, piercing, or any other suitable methods, as necessary for endo-nasal, port-based, or traditional craniotomy approach. For example, some embodiments of the present disclosure provide brain models comprising an artificial skull layer that is suitable for simulating the process of penetrating a mammalian skull. As described in further detail below, once the skull layer is penetrated, the medical procedure to be simulated using the training model may include further steps in the diagnosis and/or treatment of various medical conditions. Such conditions may involve normally occurring structures, aberrant or anomalous structures, and/or anatomical features underlying the skull and possibly embedded within the brain material.

In some example embodiments, the brain model is suitable for simulating a medical procedure involving a brain tumor that has been selected for resection. In such an example embodiment, the brain model is comprised of a brain material having a simulated brain tumor provided therein. This brain material simulates, mimics, or imitates at least a portion of the brain at which the medical procedure is directed or focused.

The simulation of the above-described medical procedure is achieved through simulation of both the surgical procedure and the associated imaging steps that are performed prior to surgery (pre-operative imaging) and during surgery (intra-operative imaging). Pre-operative imaging simulation is used to train surgical teams on co-registration of images obtained through more than one imaging methodology such as magnetic resonance (MR), computed tomography (CT) and positron emission tomography (PET). Appropriate co-registration geometrically aligns images from different modalities and, hence, aids in the surgical planning where affected regions in the human body are identified and a suitable route to access the affected region is selected. Another use of pre-operative imaging is to train the surgical team and radiologist on optimizing the imaging parameters so that clinically relevant images are acquired prior to the surgical procedure. For example, pre-operative MR images need to be acquired in a specific manner to ensure that the acquired data can be used to generate tractography information, such as Diffusion Tensor Imaging (DTI), which shows the location and direction of the brain tracks, which are not visually observable by the surgeon. Intra-operative imaging is used to guide the surgeon through accurate surgical intervention while avoiding damaging the brain tracks if possible. Surgical intervention includes accessing a previously identified affected region in the human body and subsequent resection of affected tissue.

Figure 2:
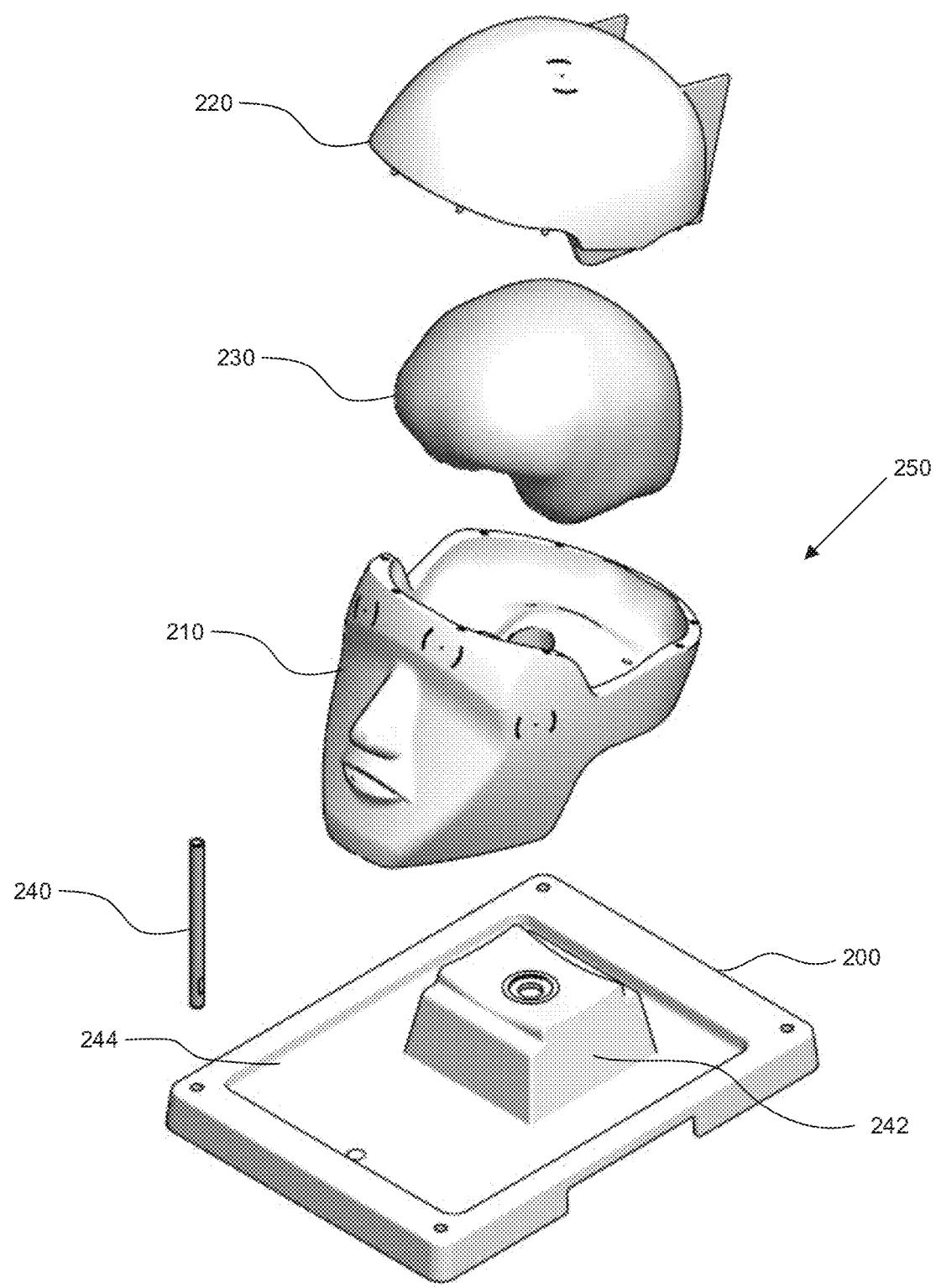
FIG. 2 is an illustration of an example training model in an exploded view, illustrating parts of the base component and the training component.
Figure 3:
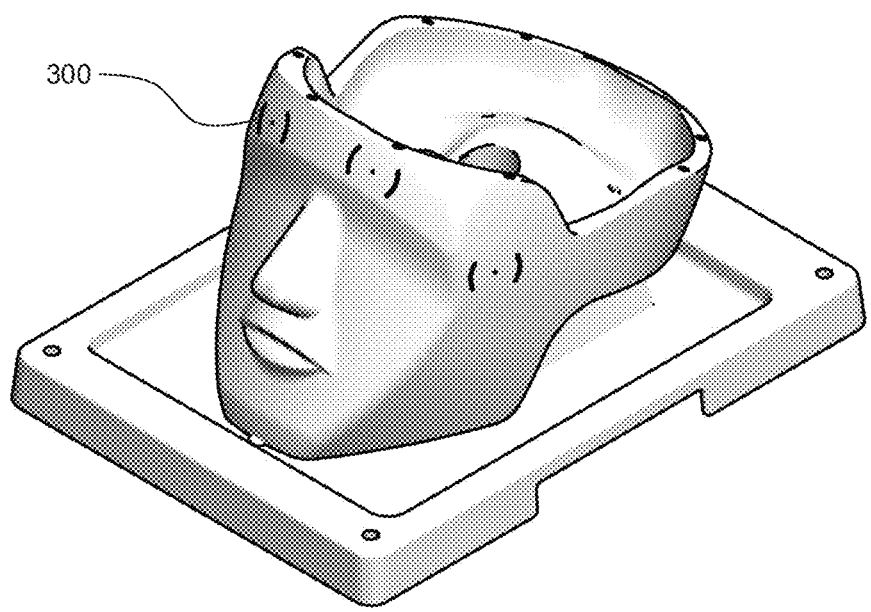
FIG. 3 is an illustration of an example base component of the training model without the skull section, illustrating fiducials that are important for registration of images acquired using different modalities.
Figure 4:
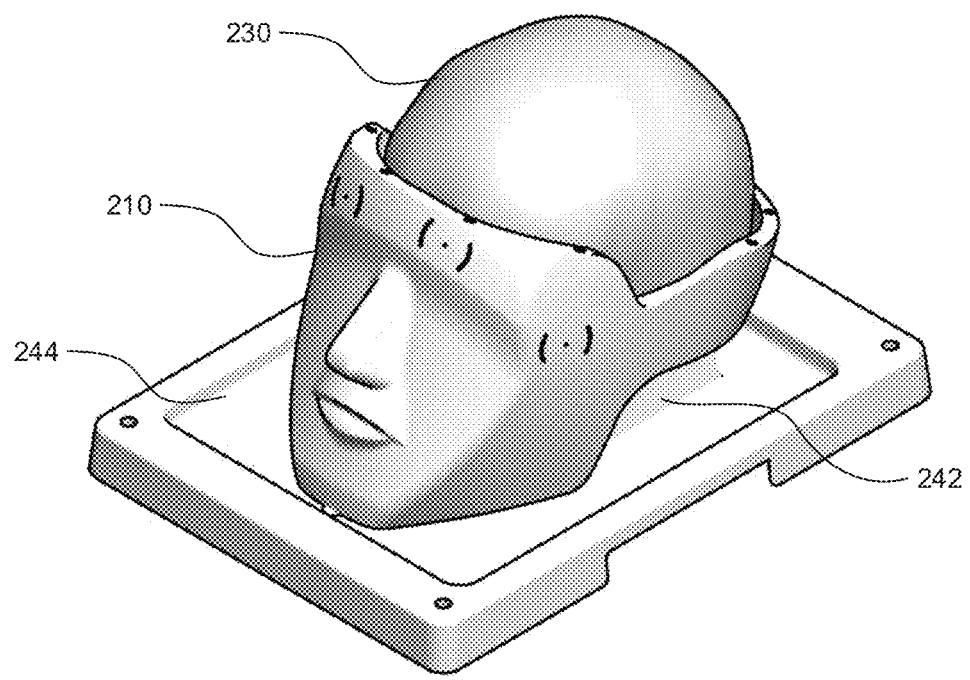
FIG. 4 is an illustration of an example base component of the training model, shown containing the training component.

Referring to FIGS. 2-4, an exploded view of an example model or phantom shown generally (250) is provided that is suitable for use in training or simulation of a medical procedure, which is invasive of a human head. The training model (250) may be adapted or designed to simulate any mammalian head or a portion thereof. It is to be understood that the person to be trained may be selected from a wide variety of roles, including, but not limited to, a medical doctor, resident, student, researcher, equipment technician, or other practitioner, professionals, or personnel. In other embodiments, the models provided herein may be employed in simulations involving the use of automated equipment, such as robotic surgical and/or diagnostic systems.

Referring now to FIG. 2, an exploded view of an example implementation of training model (250) is shown that includes a base component and a training component. The base component is comprised of a tray component (200) and a head component. The head component is comprised of a head bowl component (210) and a skull component (220). The training component may be comprised of a brain (230) with the following layers: dura, cerebro spinal fluid (CSF), vessels, white matter, grey matter, fiber bundles or tracts, target tumors, or other anomalous structures. The training component may also include the aforementioned skull component (220) when crafted in a skull-mimicking material. Optionally, the training model (250) may also be comprised of a covering skin layer (not shown). Further, the base component may include a holder (240) provided on the tray (200) to facilitate easy mounting of fiducials or reference points for navigation.

Still referring to FIG. 2, the tray component (200) forming part of the base component defines a training receptacle which includes a pedestal section (242) which is sized and configured for receipt of the head bowl component (210)

therein. Thus the training component is sized, configured or otherwise adapted to be compatible with, or complementary to the base component, and particularly the training component receptacle, such that the base component and the training component may be assembled to provide the assembled training model (250).

The base component may have any size, shape and configuration capable of maintaining the training component, mounted within the training component receptacle, in a position suitable for performing the medical procedure to be trained. The base component comprises features that enable registration, such as fiducials, touchpoint locations, and facial contours for 3D surface scanning, MR, CT, optical coherence tomography (OCT), ultrasound (US), position emission tomography (PET), optical registration or facial registration. Furthermore, the base component is adapted or configured to maintain the training component in a relatively stable or fixed position throughout the performance of the medical procedure to be simulated during the training procedure. The base component provides both mechanical support during the training procedure and aids in the proper orientation of the training components to mimic actual positioning of a patient's head during the surgical procedure.

Still referring to FIG. 2, as noted above, the base component may be composed of a head component (210) and a tray component (200). The tray component (200) is sized, configured or otherwise adapted to be compatible with, or complementary to the head component (210). The tray component (200) and pedestal (242) are adapted or configured to maintain the head component (210) in a relatively stable or fixed position throughout the performance of the imaging or medical procedure to be simulated. This may be accomplished with the use of a mechanical feature such as a snap mechanism that exists to affix the head component (210) to the tray component (200). The tray component (200) may contain a receptacle or trough (244) to catch liquids, and insertion points to affix hardware to aid with image registration and/or the medical procedure to be trained (not shown).

The head component (210) is sized, configured or otherwise adapted to be compatible with, or complementary to the tray component (200) and the training component (230). The head (bowl) component (210) is adapted or configured to maintain the training component (230) (located under the skull component (220)) in a relatively stable or fixed position throughout the performance of the medical procedure to be simulated. This head component (210) is adapted or configured to enable anatomically correct surgical positioning. This may include affixing the head component (210) with a surgical skull clamp or headrest, for example a Mayfield skull clamp. This head component (210) is also adapted or configured to enable anatomically correct imaging positioning for any contemplated imaging modality including, but not limited to, magnetic resonance (MR), CT, OCT, US, PET, optical registration or facial registration. For example, the head component (210) may be positioned in a supine position within a magnetic resonance imaging (MRI) apparatus to enable anatomically accurate coronal image acquisition.

In some embodiments, the head component (210) is shaped or configured to simulate a complete or full skull. In other words, the training component comprises the head bowl section (210) and skull section (220), wherein the bowl section (210) comprises a further portion of a complete skull and head. In some embodiments, as shown in FIG. 2, the head component, i.e, the bowl section (210) and skull section (220), and training component (230) together provide a complete simulated skull or together provide a simulated head including skull (220) and brain (230). The simulated head provided by the training model (250) enhances the reality of the overall simulation training experience.

In addition, the base and training components of the training model (250), and particularly the head component, may also include one or more external anatomic landmarks or fiducial locations (300), as shown in FIG. 3, such as those likely to be relied upon by the medical practitioner for image registration, example, touchpoints, the orbital surface, nasal bone, middle nasal concha, inferior nasal concha, occipital bone, nape, and nasal passage. These features will aid in registering the training component with the preoperative images, such as MR, CT, OCT, US, PET, so that the surgical tools can be navigated appropriately.

In this regard, navigation to establish the location of the hole or passage through the skull of the patient during the craniotomy procedure is often critical for the success of the medical procedure. Accordingly, external anatomic landmarks and/or touchpoints are provided by the simulated head in order to provide training on the correct registration of the training model with the acquired images. These anatomic landmarks and/or touchpoints may be utilized for attaching registration hardware, for example, a facial registration mask or fiducial landmark. Thus, the training model (250), and particularly the simulated head, including the brain (230), bowl (210) and skull cap (220), are sized, configured and shaped to approximate and closely resemble the size, configuration and shape of the head of a patient on which the medical procedure is to be performed. In other words, the head component may be both "life-like" and "life-sized".

The base component may be comprised of any composition or material suitable for providing the training component receptacle, and may be suitable for being cast, molded or otherwise configured to provide or support the simulated head when assembled with the training component. For instance, the base component may be comprised of any suitable casting compound, casting composition or plaster. The base component may be composed of a material that is rigid, non-reflective, non-ferrous, non-porous, cleanable, and lightweight, for example, a urethane or acrylonitrile butadiene styrene (ABS). In addition, the bowl (210) and skull (220) components of the base component may be comprised of a material that is visible by the imaging procedure of interest to enable registration. The material for the bowl (210) and skull cap (220) components of the base may therefore be selected to be visible by MR, CT, and/or PET.

As shown in FIG. 4, the training component (230) and the base component (210) are complementary or compatible such that when the training component (230) is mounted on the pedestal (242) in the training component receptacle or trough (244) in tray (200), together they provide the training model (250) with the skull cap (220) removed. Furthermore, the configuration and dimensions of the training component (230) and the bowl component (210) are complimentary or compatible such that the training component (230) may be received and fixed or releasably mounted in the bowl component (210).

In some embodiments, in order to permit the replacement or substitution of the training component (230), the training component is detachably or releasably mounted in the bowl component (210). Any detachable or releasable fastener or fastening mechanism may be used which is capable of securing the training component (230) in the receptacle, while also permitting the training component (230) to be readily detached, released or removed as desired or required. In one embodiment, the training component (230) is releasably or detachably mounted within the bowl component (210), specifically the training component is held within the bowl component (210) to emulate the mechanical fixation of the brain component (230) in the skull (220).

Thus, in the present example embodiment, the training component (230) may be removed from the bowl component (210) and replaced with an alternate, replacement or substitute training component as desired or required by the user of the training model (250). For instance, a replacement training component (230) may be required where the previous training component (230) is damaged or modified during the training of the procedure. An alternate training component (230) may be adapted or designed for use in the training of the performance of a specific medical procedure or condition of the patient, allowing for the reuse of the bowl component (210).

Alternatively, as indicated, the training model (250) may not include the bowl component (210). In this instance, the other components comprising the training model (250), such as the training component (230) in isolation, may be supported directly by a supporting structure or a support mechanism (not shown) that does not look like a mammalian head. Specifically, the supporting structure may securely maintain the training component (230), without the other components of the training model, in the desired orientation. In such an embodiment, the training component (230) may be releasably attached or fastened with the supporting structure such that the training component (230) may be removed from the supporting structure and replaced with an alternate, replacement or substitute training component (230) as desired or required by the user of the training model (250).

The present disclosure is directed to a method of producing a simulated fibrous tissue model of an anatomical part for surgical training. The simulated fibrous tissue model may also be used for demonstration or testing purposes, as well as a model for developing medical functions or devices. Furthermore, the simulated fibrous tissue model may be imageable with various imaging techniques, including ultrasound, MRI, CT, and/or PET. It should be noted that while the present disclosure describes examples in the context of a meningeal layer in a human head, the present disclosure may be applicable to other applications to simulate various fibrous tissue models.

In some embodiments, initially, a mold of the anatomical part is obtained, either through self-production or otherwise obtained through other means. In the case the tissue model is used for general training purposes, and not patient specific, the mold may be generic and the size, shape and constituent components of the anatomical part may be obtained from anatomical atlases. If on the other hand they are for patient specific training, the mold of the anatomical part may be obtained by preoperative imaging of the patient's anatomical part, such as but not limited to x-ray, PET, MRI, OCT, US or simply laser surface scanning of the anatomical part, to mention a few.

Continuing with the above embodiment, once the mold of the anatomical part has been produced, a first volume of PVA solution is applied onto the mold. In some embodiments, a soft-bristled brush may be used to apply the PVA solution to the entire surface of the mold object in a volume amount that will form a consistent layer of PVA solution on the mold surface without dripping. In some embodiments, the PVA solution may be comprised of PVA, water and an antibacterial agent. The PVA may be between 7-10% concentration with a molecular weight of 85,000-124,000 g/mol or any desired concentration or weight to enable a viscous consistency, with an ability to readily stick to adjacent surfaces, while retaining a homogenous solution. In other embodiments, the concentration of PVA may also be selected based on desired drying times and/or layer thickness.

Continuing with the embodiment above, fibrous material may then be applied onto the first volume of PVA solution previously applied onto the mold. In some embodiments, the fibrous material may be applied onto the mold surface and pressed down such that it adheres to the surface via the previously applied layer of PVA solution. In some embodiments, the fibrous layer may be any one or a combination of fiberglass mat which in some cases may be formed of various weave patterns, papers, textiles, elastic meshes or any fibrous material varying in density and/or weave that may achieve the desired simulated fibrous tissue material properties and behaviors. For example, certain fibrous material may better mimic the mechanical properties of, for instance, human dura mater (making up a meningeal layer) as described in van Noort, R. et al., "The mechanical properties of human dura mater and the effects of storage media" (1981) 2 Clinical Physics and Physiological Measurement 3 at 197-203.

Further to the embodiment being described herein, a second volume of PVA solution may then be applied onto the fibrous material sufficient to soak the fibrous material such that the fibrous material completely absorbs the PVA solution. In some examples, the second volume of PVA solution may be applied with a soft-bristled brush onto the fibrous material to completely soak and coat the fibrous material such that the fibrous material fully contacts the mold surface without any wrinkles or air bubbles.

In another embodiment, additional fibrous material may be added on top of additional PVA solution, in layers, as desired to achieve simulated fibrous tissue material properties and behaviors.

In another embodiment, additional components, such as aesthetic components (e.g. pigments, opacifiers, etc.) may be integrated into the simulated tissue model, for example, by directly mixing the component(s) into the PVA solution or the fibrous material as desired to achieve a more realistic visual mimic of simulated fibrous tissue properties. For example, pigments may be incorporated into all PVA solution layers, some of the PVA solution layers or a single fibrous material layer to simulate a more realistic visual mimic of a tissue of interest.

In another embodiment, additional components, such as aesthetic and functional components (e.g. simulated blood vessels, simulated lesions, etc.), may be integrated into the simulated tissue model to visually and functionally mimic fibrous tissue. For example, a simulated blood vessel insert may be embedded in and contained between PVA-fibrous composite material layers, or itself act as a fibrous material layer flanked by PVA solution layers, to simulate a more realistic visual and functional mimic of, for instance, the meningeal layer of a mammalian head. In another example, a simulated blood vessel insert may be three-dimensional (3D), rather than a two-dimensional (2D) flat layer, and embedded in between PVA-fibrous material layers or PVA solution layers so as to transcend more than one layer of PVA-fibrous material or PVA solution. In another example, abnormalities or other aberrant or anomalous structures, such as lesions or tumors may also be integrated into the simulated tissue model to visually and functionally mimic various conditions in fibrous tissue.

In another embodiment, additional components, such as functional components (e.g. a blueprint, map, instruction, drawing, marking, or other such guide) may be embedded between PVA-fibrous material layers, or as a fibrous layer. Functional components may act to map out anatomy, including providing drawings of hidden anatomy, mark or otherwise describe a region or regions of interest, and/or provide an instruction or guide to enable a user to practice their surgical skills. For example, a marked symbol indicating a surgical point may be embedded in between PVA-fibrous material layers, or as a fibrous material layer, to indicate, for instance, an insertion point for a surgical tool in the meningeal layer of a mammalian head. In another example, an instruction "sheet" may be embedded in between PVA-fibrous material layers, or as a fibrous material layer, to indicate, for instance, where to make a surgical incision and how long the incision need be. The marker indicating a surgical point may be a 2D flat layer embedded and contained between PVA-fibrous material layers, or as a fibrous material layer flanked by PVA solution layers, or a 3D marker embedded in between PVA-fibrous material layers or PVA solution layers so as to transcend more than one layer of PVA-fibrous material or PVA solution.

Continuing with the embodiment described above, when as many layers of the PVA solution and fibrous material (with or without additional components) have been applied as desired, the PVA-fibrous material composite may be dried, by air or any other suitable means, to conform and set to the shape of the anatomical mold.

Once set, the simulated fibrous tissue model conform may be detached from the anatomical mold. Although the simulated fibrous tissue model may be in dehydrated form when dry, it may be rehydrated after soaking in deionized water. When rehydrated, the model may retain its shape and remain moist and flexible to simulate tissue properties and behaviours, and may be resistant to stretching, tearing and cutting without the use of surgical tools.

In another embodiment, following the desired amount of applied PVA solution and fibrous material layers, a freeze-thaw cycle may be performed on the PVA-fibrous material composite to create a cryogel. A method of creating the cryogel may be further explained in US Publication US20160027341 entitled, "METHOD FOR PRODUCING ANATOMICAL PHANTOMS WITH CONSTITUENTS HAVING VARIABLE DENSITIES", which is herein incorporated by reference in its entirety.

Figure 5:
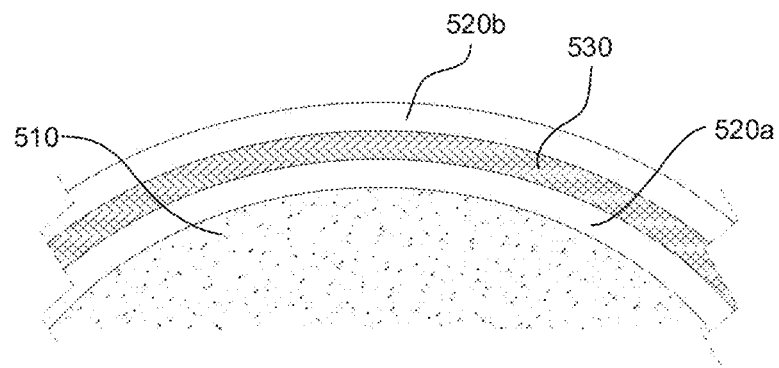
FIG. 5 is an illustration of an example of the layers of the simulated fibrous tissue model in a cross-section view.

FIG. 5 illustrates, in a non-limiting example, a cross-sectional view of the layers of a simulated fibrous tissue model of an anatomical part. A portion of a mold surface (510) (of an anatomical part) is shown. A first volume of PVA solution (520a) is applied onto the mold surface (510). A fibrous material (530) is applied onto the first volume of PVA solution (520a) onto the mold surface (510). A second volume of PVA solution (520b) is applied onto the fibrous material (530) sufficient to soak the fibrous material (530).

Figure 6:
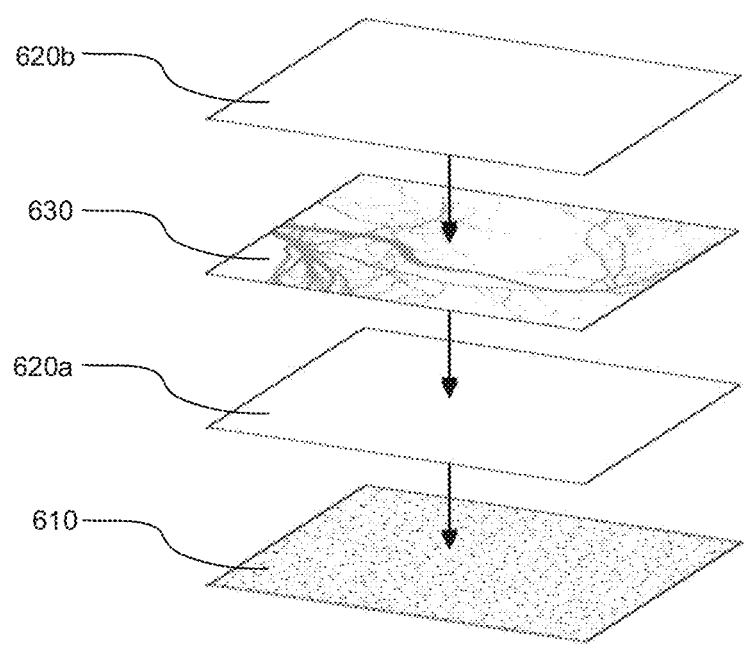
FIG. 6 is an illustration of an example of the layers of the simulated fibrous tissue model with embedded simulated blood vessels in an exploded view.

FIG. 6 illustrates, in a non-limiting example, an exploded view of the layers of a simplified simulated fibrous tissue model with the addition of visual and functional components, such as simulated blood vessels inserts, to simulate a more realistic visual and functional mimic of an anatomical part. This illustration depicts simulated blood vessel inserts (630) that are embedded between layers of PVA solution (620a and 620b) on a mold surface (610).

Figure 7A:
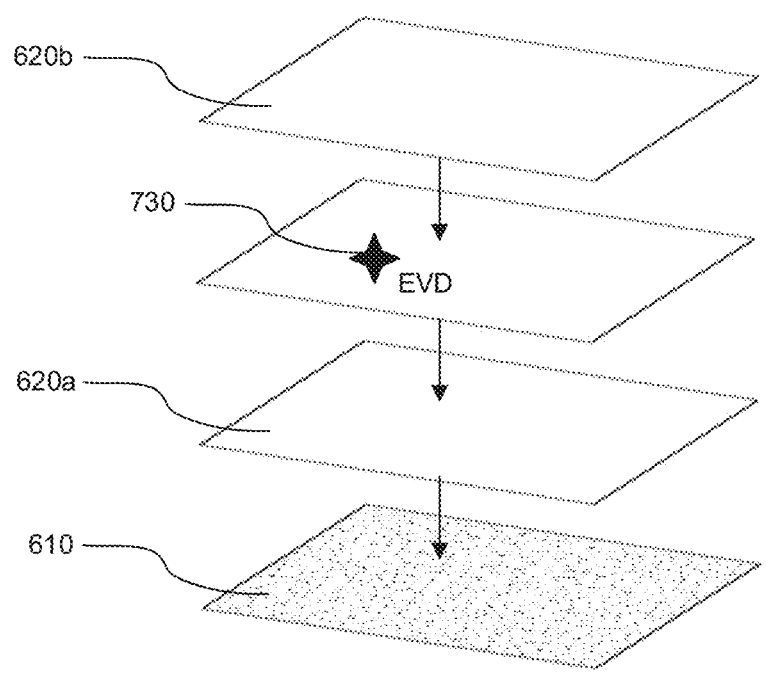
FIGS. 7a and 7b are illustrations of example layers of the simulated fibrous tissue model with embedded instructions or guidelines in an exploded view and cross-sectional view, respectively.
Figure 7B:
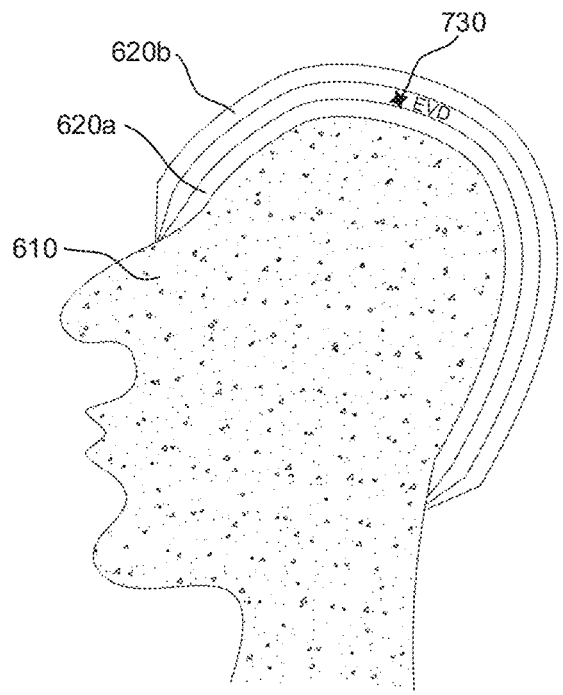

FIG. 7a illustrates, in a non-limiting example, an exploded view of the layers of a simplified simulated fibrous tissue model with the addition of a functional component, such as an instruction marker (730), embedded between layers of PVA solution (620a and 620b) on a mold surface (610) to provide a guide for surgical training. FIG. 7b illustrates, in a non-limiting example, "EVD" (external ventricular drain) and a symbol (730), embedded between layers of PVA solution (620a and 620b) on a mold (610), the "EVD" and symbol acting as a functional component to serve as an instruction marker indicating where an external ventricular drain should be inserted, for instance, during neurosurgery.

Figure 8A:
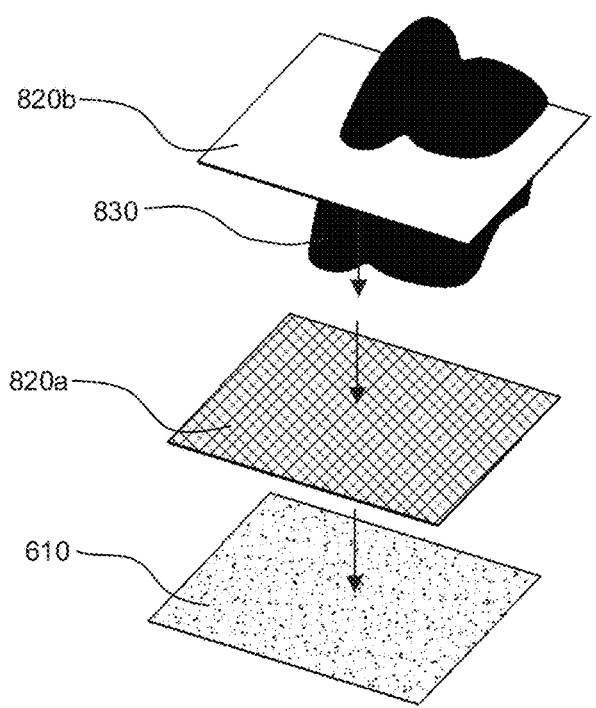
FIGS. 8a and 8b are illustrations of example layers of the simulated fibrous tissue model with embedded lesions in an exploded view and cross-sectional view, respectively.
Figure 8B:
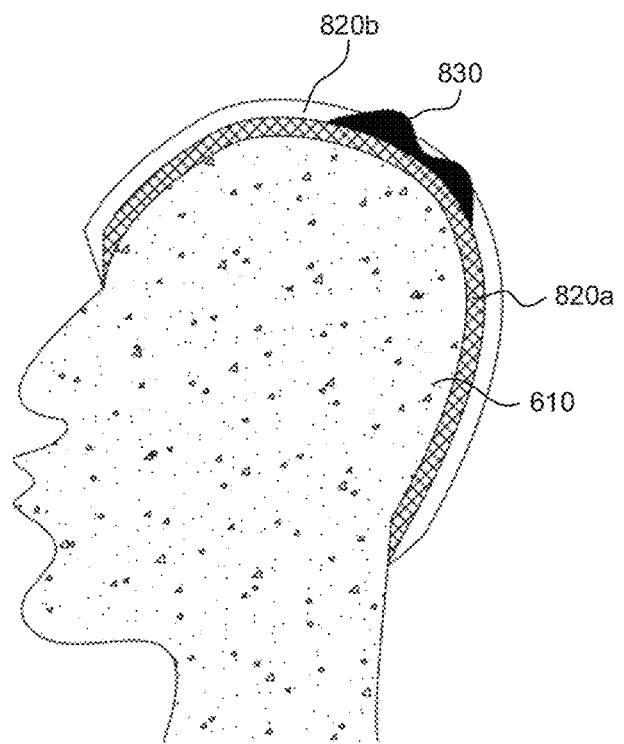

FIG. 8a illustrates, in a non-limiting example, an exploded view of the layers of a simplified simulated fibrous tissue model with the addition of a visual and functional component, such as a simulated lesion (e.g. a wound), to simulate a more realistic visual and functional mimic of an anatomical part. This illustration depicts a lesion (830) embedded between layers of PVA-fibrous material and PVA solution (820a and 820b, respectively) on a mold surface (610). Note that in this example, the simulated lesion is 3D and although rooted in a PVA-fibrous material layer, is not completely contained within a single layer, rather, the 3D simulated lesion transcends more than one layer of PVA solution. FIG. 8b illustrates this non-limiting example in a cross-sectional view.

Figure 9:
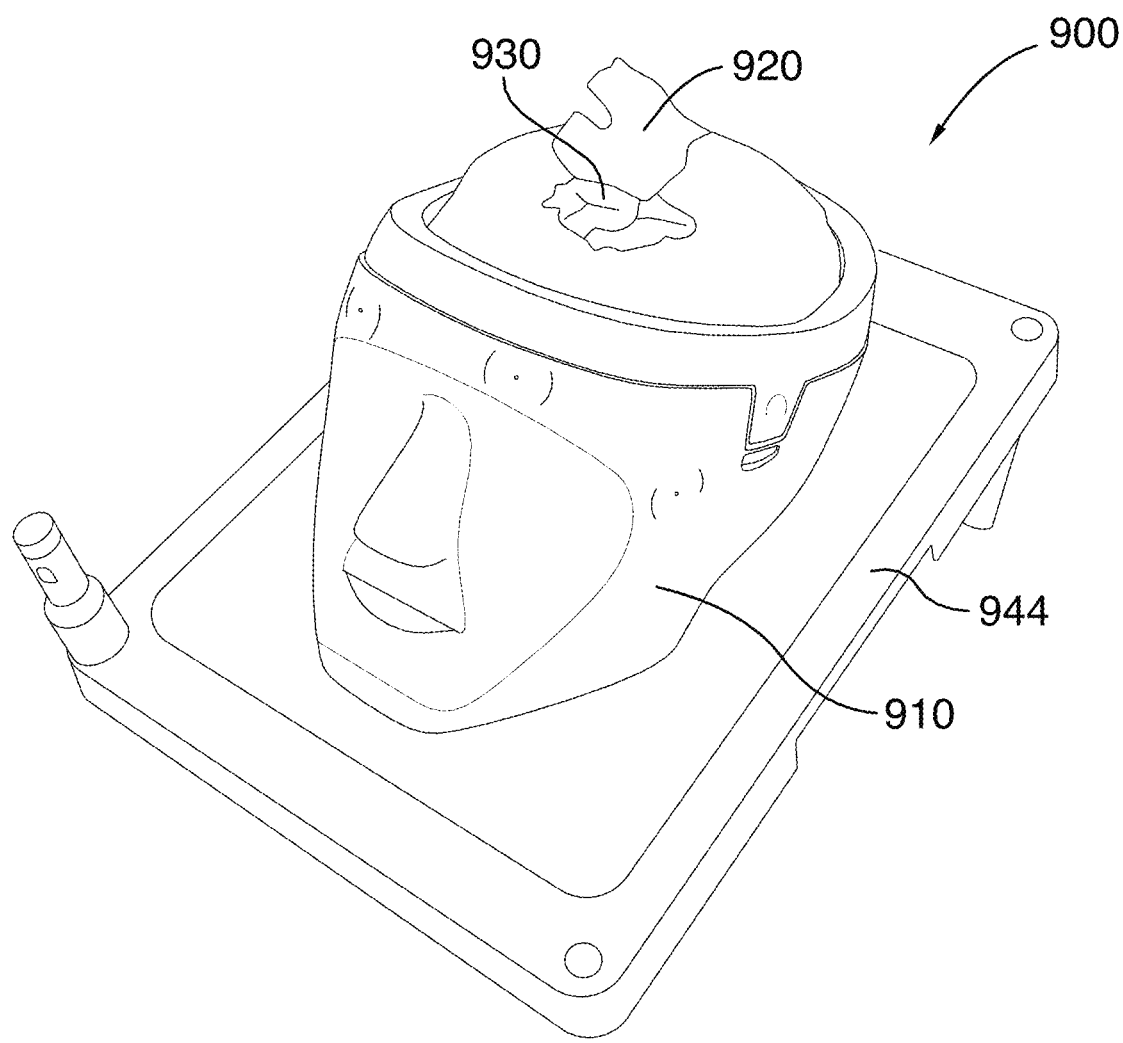
FIG. 9 is an example embodiment depicting a simulated fibrous tissue model of a meningeal layer used in a complementary anatomical brain simulation kit.

FIG. 9 depicts, in a non-limiting example, a simulated fibrous tissue model of a meningeal layer used in a complementary anatomical head simulation kit (900). The figure shows the simulated fibrous tissue model of a meningeal layer (that has been cut) (920) enveloping a simulated brain model (930) where both the brain and meningeal layer sit in a human head model (910), the head model mounted on a pedestal (not shown) in a tray component (944).

While the teachings described herein are in conjunction with various embodiments for illustrative purposes, it is not intended that the teachings be limited to such embodiments. On the contrary, the teachings described herein encompass various alternatives, modifications, and equivalents, without departing from the embodiments, the general scope of which is defined in the appended claims.

Except to the extent necessary or inherent in the process themselves, no particular order to steps or stages of methods or processes described in this disclosure is intended or implied. In many cases the order of process steps may be varied without changing the purpose, effect, or import of the methods described.

The invention claimed is:

1. A method of creating a simulated fibrous tissue model of an anatomical part, the method comprising:
    providing a mold of an anatomical part;
    providing a complete PVA-fibrous material composite layer, the complete PVA-fibrous material composite layer comprising a plurality of PVA-fibrous material layers, each PVA-fibrous material layer of the plurality of PVA-fibrous material layers comprising a PVA material and a fibrous material-based composite, the fibrous material-based composite comprising a fiberglass mat having a plurality of weave patterns, and providing the complete PVA-fibrous material composite layer comprising:
        providing a polyvinyl alcohol (PVA) solution;
        applying a volume of the PVA solution onto the mold;
        applying a fibrous material onto the volume of the PVA solution, applying the fibrous material comprises providing the fiberglass mat having the plurality of weave patterns; and applying another volume of the PVA solution onto the fibrous material sufficient to soak through the fibrous material, thereby forming the complete PVA-fibrous material composite layer;

drying the complete PVA-fibrous material composite to conform and set to the shape of the mold;

releasing the complete PVA-fibrous material composite from the mold; and subjecting the complete PVA-fibrous material composite to at least one freeze-thaw cycle, thereby forming a cryogel, and thereby forming the simulated fibrous tissue model, whereby the model is imagable with an imaging technique, and wherein the imaging technique comprises at least one of ultrasound (US), magnetic resonance imaging (MRI), computed tomography (CT), and positron emission tomography (PET).

2. The method of claim 1, wherein the model is usable for at least one of demonstrating, testing, and developing at least one of medical functions, medical devices, and surgical training.

3. The method of claim 1, wherein providing the complete PVA-fibrous material composite layer is repeatable, whereby at least one additional complete PVA-fibrous material composite layer is disposed over a previous complete PVA-fibrous material composite layer.

4. The method of claim 1, wherein providing the PVA solution comprises: providing PVA in a concentration range of 7% to 10% and in a molecular weight range of 85,000 g/mol to 124,000 g/mol; providing deionized water; providing an antibacterial agent; dissolving the PVA in the deionized water; and at least one of dissolving and admixing the antibacterial agent in the deionized water.

5. The method of claim 1, wherein applying the fibrous material further comprises providing at least one of a paper, an elastic mesh, a fibrous material of varying density and weave properties to mimic tissue properties and behaviors.

6. The method of claim 1,
wherein applying the fibrous material comprises providing a paper, and
wherein providing the paper comprises providing at least one of printed instructions, drawings of hidden anatomy, and a description of a region of interest.

7. The method of claim 1, wherein providing the mold of the anatomical part comprises providing the mold configured to form a meningeal layer of a mammalian brain.

8. The method of claim 1,
wherein providing the mold of the anatomical part comprises providing the mold configured to form at least one simulated anatomical part corresponding to at least one of: abnormalities, vasculature components, and other anatomical components,
wherein the at least one simulated anatomical part provides at least one of a visual mimic and a biomechanical anatomic mimic, and
wherein the at least one simulated anatomical part is embedded within the model to simulate tissue properties and behaviors.

9. The method of claim 1, wherein providing the PVA solution further comprises providing and admixing at least one of pigments, opacifiers, and other aesthetic components.

10. The method of claim 1, wherein providing the complete PVA-fibrous material composite layer further comprises embedding at least one of a blueprint and an instruction between any two PVA-fibrous material layers of the plurality of PVA-fibrous material layers to guide at least one of demonstrating, testing, and developing at least one of medical functions, medical devices, and surgical training.

11. The method of claim 1, wherein the model is at least one of dehydratable and rehydratable.

12. The method of claim 1, wherein the model is usable for simulating fibrous tissues in the anatomical part.

13. A simulated fibrous tissue model of an anatomical part, comprising:
a tissue model comprising a complete polyvinyl alcohol (PVA)-fibrous material composite layer molded to mimic an anatomical part,
said complete PVA-fibrous material composite layer comprising a plurality of PVA-fibrous material layers, each PVA-fibrous material layer of the plurality of PVA-fibrous material layers comprising a PVA material and a fibrous material-based composite, the fibrous material-based composite comprising a fiberglass mat having a plurality of weave patterns, and
the tissue model configured to mimic tissue properties and behaviors of said anatomical part for medical applications,
wherein the model is imagable with an imaging technique, and
wherein the imaging technique comprises at least one of ultrasound (US), magnetic resonance imaging (MRI), computed tomography (CT), and positron emission tomography (PET).

14. The model of claim 13,
wherein the model comprises at least one simulated anatomical part corresponding to at least one of: abnormalities, vasculature, and anatomical components,
wherein the at least one simulated anatomical part is configured to provide at least one of a visual mimic and a biomechanical mimic, and
wherein the at least one simulated anatomical part is embedded within the model.

15. The model of claim 13, wherein the PVA material further comprises at least one of pigments, opacifiers, and other aesthetic components.

16. The model of claim 13, wherein the complete PVA-fibrous material composite layer further comprises at least one of a blueprint and an instruction embedded between any two PVA-fibrous material layers of the plurality of PVA-fibrous material layers to guide at least one of demonstrating, testing, and developing at least one of medical functions, medical devices, and surgical training.

17. The model of claim 13, wherein the model is usable for simulating fibrous tissues in the anatomical part.

* * * * *